US010020579B1

(12) United States Patent
Zheng et al.

(10) Patent No.: US 10,020,579 B1
(45) Date of Patent: Jul. 10, 2018

(54) WIRELESS LOCAL AREA NETWORK ANTENNA FOR A METAL HOUSING

(71) Applicant: Amazon Technologies, Inc., Seattle, WA (US)

(72) Inventors: Ming Zheng, Cupertino, CA (US); Peter Eli Renner, Sunnyvale, CA (US); Adrian Napoles, Cupertino, CA (US); Khaled Ahmad Obeidat, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 300 days.

(21) Appl. No.: 14/856,423

(22) Filed: Sep. 16, 2015

(51) Int. Cl.
*H01Q 5/50* (2015.01)
*H01Q 1/24* (2006.01)
*H01Q 9/04* (2006.01)
*H04B 1/3827* (2015.01)
*H01Q 1/50* (2006.01)

(52) U.S. Cl.
CPC .............. *H01Q 5/50* (2015.01); *H01Q 1/24* (2013.01); *H01Q 1/243* (2013.01); *H01Q 1/50* (2013.01); *H01Q 9/04* (2013.01); *H04B 1/3833* (2013.01)

(58) Field of Classification Search
CPC ......................................... H01Q 1/243–1/244
See application file for complete search history.

(56) References Cited

U.S. PATENT DOCUMENTS

2016/0013543 A1* 1/2016 Nguyen ................. H01Q 1/243
343/702

\* cited by examiner

*Primary Examiner* — Jessica Han
*Assistant Examiner* — Amal Patel
(74) *Attorney, Agent, or Firm* — Lowenstein Sandler LLP

(57) ABSTRACT

Antenna structures and methods of operating the same are described. One antenna structure includes a ground plane, a feed point, an antenna element, and a parasitic element. The feed point can be coupled to the antenna element and can receive a signal to cause the antenna structure to radiate electromagnetic energy. The antenna element includes: a first portion that extends in a first direction from the feeding point at the RF feed; a second portion that extends from a distal end of the first portion; a third portion that extends from a side of the second portion; a fourth portion that extends from the third portion; and a fifth portion that extends from the fourth portion. The parasitic element includes: a sixth portion that extends from the fourth portion; and the seventh portion that extends from the sixth portion to the ground plane.

20 Claims, 11 Drawing Sheets

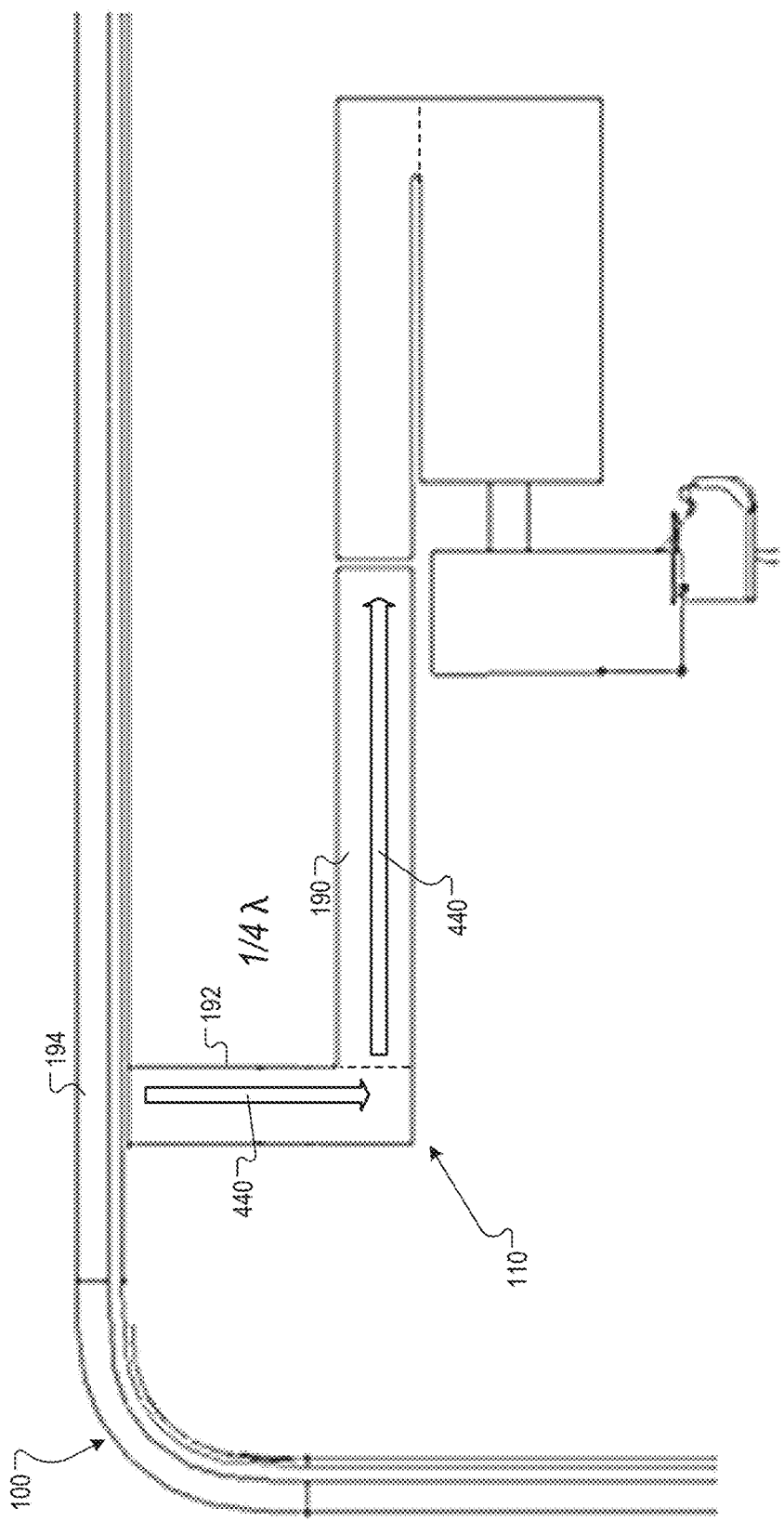

WIRELESS LOCAL AREA NETWORK ANTENNA FOR A METAL HOUSING

BACKGROUND

A large and growing population of users is enjoying entertainment through the consumption of digital media items, such as music, movies, images, electronic books, and so on. The users employ various electronic devices to consume such media items. Among these electronic devices are electronic book readers, cellular telephones, personal digital assistants (PDAs), portable media players, tablet computers, netbooks, laptops and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present invention will be understood more fully from the detailed description given below and from the accompanying drawings of various embodiments of the present invention, which, however, should not be taken to limit the present invention to the specific embodiments, but are for explanation and understanding only.

FIG. 4 illustrates a current flow of the low-band parasitic structure for the electronic device according to one embodiment.

DETAILED DESCRIPTION

Figure 1A:
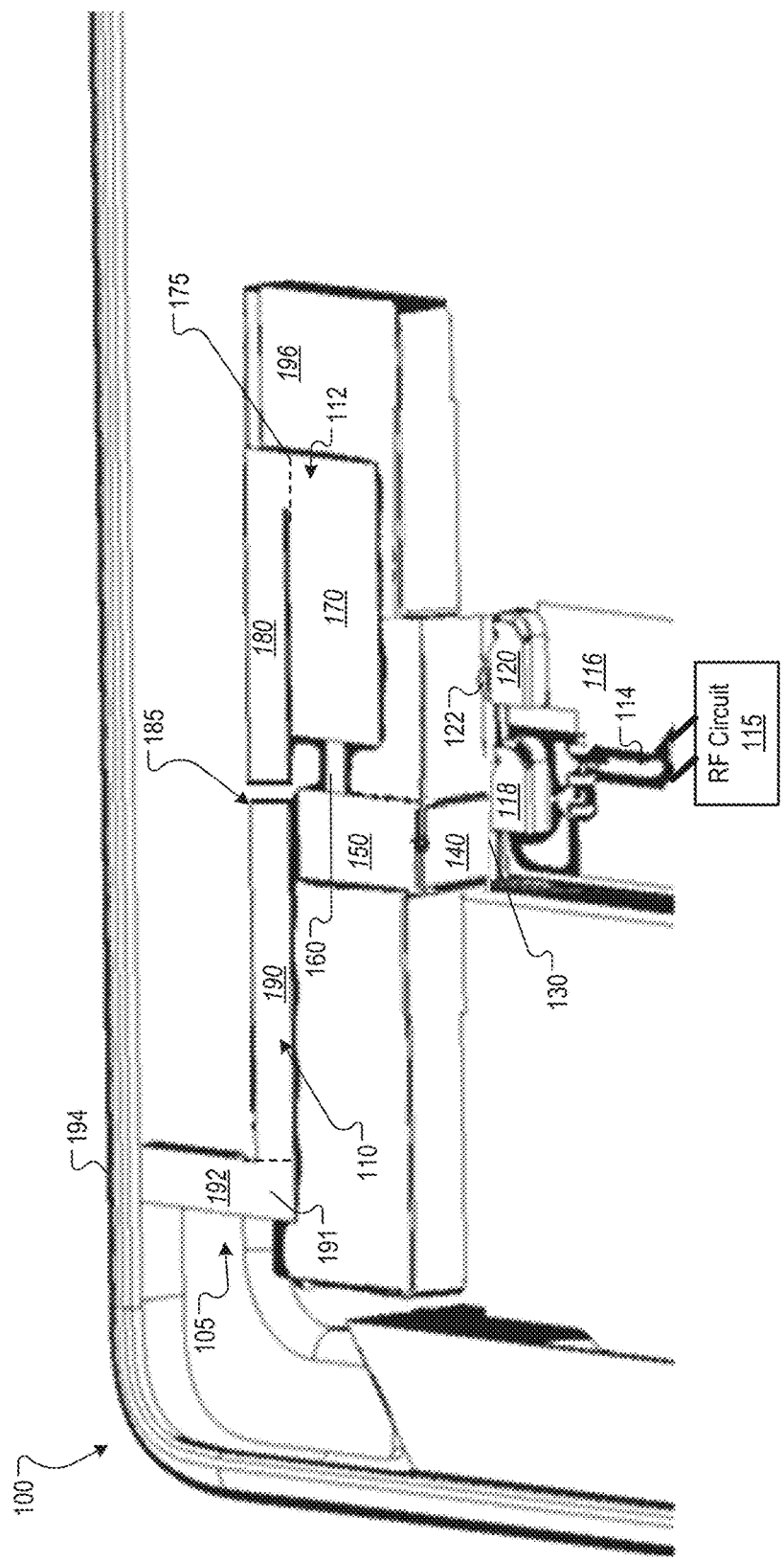
FIG. 1A is a diagram of an antenna structure of an electronic device with a low-band parasitic structure and a high-band structure according to one embodiment.

Some conventional electronic devices use externally mounted antennas to avoid interference from internal components of the electronic devices. As electronic devices continue to be miniaturized, antennas may be integrated within the electronic devices to increase functionality and aesthetic design of the electronic devices.

With the integration of antennas into electronic devices, a material of the housing of the electronic device may play an impact a level of interference with an integrated antenna when the electronic device communicates data. For example, to provide durability and ruggedness, the electronic device may have a primarily metal housing. However, the metal housing may reflect electromagnetic energy radiated by the integrated antenna when communicating with other electronic devices. In particular, the reflection of the electromagnetic waves may interfere with the integrated antenna transmitting and receiving signals. A conventional mobile device with a metal back cover typically requires windows near the corners of the metal back cover in order to include integrated antennas. Other conventional mobile devices use active tunable components to accommodate the integrated antennas. Additionally, these conventional designs with integrated antennas may not have sufficient bandwidth to meet a bandwidth demand for services used by the electronic device.

The embodiments described herein may address the above noted deficiencies by an electronic device employing an antenna structure that utilizes a metal cover of the electronic device, such as a metal back cover. The electronic device may be any content rendering device that includes a modem for connecting the electronic device to a network. Examples of such electronic devices include electronic book readers, portable digital assistants, mobile phones, laptop computers, portable media players, tablet computers, cameras, video cameras, netbooks, notebooks, desktop computers, gaming consoles, media streaming devices, set-top boxes (STBs), Blu-ray® or DVD players, media centers, drones, speech-based personal data assistants, and the like. The electronic device may connect to a network to obtain content from a server computing system (e.g., an item providing system) or to perform other activities. The electronic device may connect to one or more different types of cellular networks.

The antenna structure herein may utilize portions of the metal cover as radiators, respectively without windows near the corners as done conventionally. The antenna structure herein may also utilize internal coupling elements for tuning. One advantage of preserving the corners of the metal cover may be to enhance the durability and reliability of the electronic device.

The antenna structure may have a unique grounding structure, as described in more detail herein. The grounding structure utilizes the metal cover as a ground element to cause currents to flow through the antenna elements, including portions of the metal cover, as described and illustrated herein. The electronic device may communicate at a low frequency band, a first high frequency band, a second high frequency band, and a third high frequency band using the antenna structure as described and illustrated herein. The embodiments described herein utilize the metal cover to give effective radiation and provide bandwidth without active tuning components or impedance matching components.

Several topologies of antenna structures are contemplated herein. The antenna structures described herein may be used for wireless area network (WAN) technologies, such as cellular technologies including Long Term Evolution (LTE) frequency bands, third generation (3G) frequency bands, Wi-Fi® and Bluetooth® frequency bands or other wireless local area network (WLAN) frequency bands, global navigation satellite system (GNSS) frequency bands (e.g., positioning system (GPS) frequency bands), and so forth.

FIG. 1A is a diagram of an antenna structure 105 of an electronic device 100 with a parasitic element 110 and an antenna element 112 according to one embodiment. In one embodiment, the electronic device 100 may include: radio frequency (RF) circuit 115, a first coupling element 118, a second coupling element 120, a ground plane 116, an antenna structure 105, and a metal cover 194. The RF circuit 115 may apply a RF signal at a feed point 130 via conductive traces 114. The RF circuit 115 can be coupled to an RF feed. In another embodiment, the antenna structure 105 is coupled to the RF feed.

In another embodiment, the electronic device can include a printed circuit board that includes: a processing device that generates an RF signal; a RF radio coupled to the processing device. The RF radio is coupled to the antenna structure 105 and the RF radio sends RF signal to the antenna structure 105. In another embodiment, the antenna structure 105 may include: the feed point 130, where the feed point 130 is coupled to the RF circuit 115 using the first coupling element 118; a ground point 122, where the ground point 122 is coupled to the ground plane 116 using the second coupling element 120; the parasitic element 110; and the antenna element 112. In one example, the feed point 130 is coupled to the RF circuit 115 using the first coupling element 118, the second coupling element 120, or both the first coupling element 118 and the second coupling element 120. In another example, the first coupling element 118 and the second coupling element 120 can be c-clips, clip, holders, or other connectors. In one example, the second coupling element 120 that couples the ground point 122 with the ground plane 116 can be used as a tuning element. In another embodiment, the antenna structure 105 only includes the first coupling element 118 to couple the feed point 130 to the RF circuit 115, e.g., the antenna structure 105 operates without the second coupling element 120 that is used as the tuning element.

The antenna element 112 may include: the feed point 130 that receives an RF signal from the RF circuit 115 and that is coupled to a first portion 140; the first portion 140 that extends perpendicularly away from the feeding point 130 or the ground plane 116 towards a second portion 150 in a first direction, where the feed point 130 is coupled to the RF circuit using a coupling element; the second portion 150 extends from a distal end of the first portion 140 in a second direction towards a third portion 160, where the second portion 150 being perpendicular to the first portion 140; the third portion 160 extends from a first side of the second portion 150 in the third direction to a first side of a fourth portion 170, where the third portion 160 being perpendicular to the second portion 150; the fourth portion 170 extends from the third portion 160 in a fourth direction to a first side of a fifth portion 180, the fifth portion 180 being parallel to the fourth portion 170. In one embodiment, the fourth portion 170 extends along a first axis and the fifth portion 180 extends along a second axis. In another embodiment, the first axis is parallel to the second axis. In another embodiment, the fourth portion is connected to the fifth portion 180 by a connecting member 175, such as a curved member. In another embodiment, the connecting member 175 is a u-shaped member. In another embodiment, the connecting member 175 is an S-shaped member.

In one example, the height of the antenna structure 105 may be approximately 5.5 millimeters (mm), where the height is measured from an inner surface of the metal cover 194 to a distal end of the first portion 140.

The parasitic element 110 may include a sixth portion 190 that is parasitically coupled to a distal end of the fifth portion 180. The parasitical coupling can include a gap 185 between the fifth portion 180 and the sixth portion 190. For example, the parasitic element 110 may be disposed to form a gap between the parasitic element 110 and the antenna element 112. In this example, a proximity of the parasitic element 110 to the antenna element 112 may form a parasitic coupling. The feeding point 130 may parasitically induce a second current on a second radiator to radiate electromagnetic energy in a second frequency range. In one example, the second radiator can be the parasitic element 110. The sixth portion 190 may extend from the fifth portion 180 in the fourth direction to a seventh portion 192, the sixth portion 190 being parallel to the fifth portion 180. The seventh portion 192 may extend from the sixth portion 190 to the metal cover 194 in the second direction. As illustrated in FIG. 1A, the seventh portion 192 is coupled to the metal cover 194 and extends from the metal cover 194 in a fifth direction and the sixth portion 190 extends from the seventh portion 192 in the third direction towards the fifth portion 180. The sixth portion 190 is disposed to form a first gap between the sixth portion 190 and the fifth portion 180 and a second gap between the sixth portion 190 and the second portion 150. In one embodiment, the sixth portion 190 extends along the second axis and the seventh portion 192 extends along a third axis. In another embodiment, the second axis is perpendicular to the third axis. In another embodiment, the sixth portion 190 is connected to the seventh portion 192 by a curved member 191. In another embodiment, the curved member 191 is an L-shaped member. In another embodiment, the curved member 191 is an S-shaped member. The seventh portion 192 may be coupled to the metal cover 194. In one example, at least a portion of the parasitic element 110 and the antenna element 112 are located above a speaker or a speaker box 195.

In one embodiment, the antenna structure 105 may be a triple-resonance structure that may resonate at a first frequency range, a second frequency range, and a third frequency range. In one example, the first frequency range may be a low-band resonant mode, the second frequency range can be a first high-band resonant mode, and the third frequency range can be a second high band resonant mode. In another example, the antenna element 112 may operate as a first radiator, the parasitic element 110 may operate as a second radiator, and the parasitic element 110 and the metal cover 194 may operate as a third radiator. In this example, the first radiator may radiate at 5 gigahertz (GHz), the second radiator may radiate at 2.4 GHz, and the third radiator may radiate at 6 GHz, based on a signal received by the antenna structure 105 at the feed point 130. The metal cover 194 can be a ground plane.

In one example, the feed point 130 may receive: a first RF signal that causes the antenna element 112 to radiate electromagnetic energy in a first frequency range; a second RF signal that causes the parasitic element 110 to radiate electromagnetic energy in a second frequency range; and a third RF signal that causes the parasitic element 110 and the metal cover 194 to radiate electromagnetic energy in a third frequency range. In another example, the first radiator, the second radiator, and the third radiator are to operate concurrently. In another example, the first radiator, the second radiator, and the third radiator may operate separately or independent of each other.

The RF circuit 115 may include a wireless area network (WAN) module. In one embodiment, the WAN module is operable to cause the parasitic element 110 to radiate electromagnetic energy in a first frequency range in a first resonant mode and radiate electromagnetic energy in a second frequency range in a second resonant mode. In another embodiment, the WAN module is operable to cause the antenna element 112 to radiate electromagnetic energy in a third frequency range in a third resonant mode. In another embodiment, the RF circuit 115 may include other modules, such as a wireless local area network (WLAN) module, a personal area network (PAN) module, global navigation satellite system (GNSS) module (e.g., global positioning system (GPS) module), or the like.

The parasitic element 110 may be designed to be self-resonant at 800 MHz and 950 MHz for the dual resonance. These modes may be further matched to desired working bands of interest. Alternatively, other resonant modes may be achieved, such as for WLAN frequency bands. For example, in dual-band Wi-Fi® networks, the parasitic element 110 and antenna element 112 may be matched in the two modes to cover the 2.4 GHz band and the 5 GHz band. For example, the WLAN module may include a WLAN RF transceiver for communications on one or more Wi-Fi® bands (e.g., 2.4 GHz and 5 GHz).

It should be noted that the Wi-Fi® technology is the industry name for wireless local area network communication technology related to the IEEE 802.11 family of wireless networking standards by Wi-Fi Alliance. For example, a triple-band WLAN RF transceiver allows an electronic device to exchange data or connection to the Internet wirelessly using radio waves in three WLAN bands (2.4 GHz band, 5 GHz band, and the 6 GHZ band) via one or multiple antennas. For example, a dual-band WLAN RF transceiver includes a 5 GHz WLAN channel and a 2.4 GHz WLAN channel. In other embodiments, the antenna structure may include additional RF modules and/or other communication modules, such as a wireless local area network (WLAN) module, a GPS receiver, a near field communication (NFC) module, an amplitude modulation (AM) radio receiver, a frequency modulation (FM) radio receiver, a personal area network (PAN) module (e.g., Bluetooth® module, Zigbee® module), a Global Navigation Satellite System (GNSS) receiver, or the like. The RF circuit 115 may include one or multiple RFFE (also referred to as RF circuit). The RFFEs may include receivers and/or transceivers, filters, amplifiers, mixers, switches, and/or other electrical components.

The RF circuit 115 may be coupled to a modem that allows the electronic device 100 to handle both voice and non-voice communications (such as communications for text messages, multimedia messages, media downloads, web browsing, etc.) with a wireless communication system. The modem may provide network connectivity using any type of digital mobile network technology including, for example, LTE, LTE advanced (4G), CDPD, GPRS, EDGE, UMTS, 1xRTT, EVDO, HSDPA, WLAN (e.g., Wi-Fi® network), etc. In the depicted embodiment, the modem may use the RF circuit 115 to radiate electromagnetic energy on the antennas to communication data to and from the electronic device 100 in the respective frequency ranges. In other embodiments, the modem may communicate according to different communication types (e.g., WCDMA, GSM, LTE, CDMA, WiMAX, etc.) in different cellular networks.

The RF circuit 115 may be coupled to a modem that allows the electronic device 100 to handle both voice and non-voice communications (such as communications for text messages, multimedia messages, media downloads, web browsing, etc.) with a wireless communication system. The modem may provide network connectivity using any type of digital mobile network technology including, for example, LTE, LTE advanced (4G), CDPD, GPRS, EDGE, UMTS, 1xRTT, EVDO, HSDPA, WLAN (e.g., Wi-Fi® network), etc. In the depicted embodiment, the modem may use the RF circuit 115 to radiate electromagnetic energy on the antennas to communication data to and from the electronic device 100 in the respective frequency ranges. In other embodiments, the modem may communicate according to different communication types (e.g., WCDMA, GSM, LTE, CDMA, WiMAX, etc.) in different cellular networks.

Figure 1B:
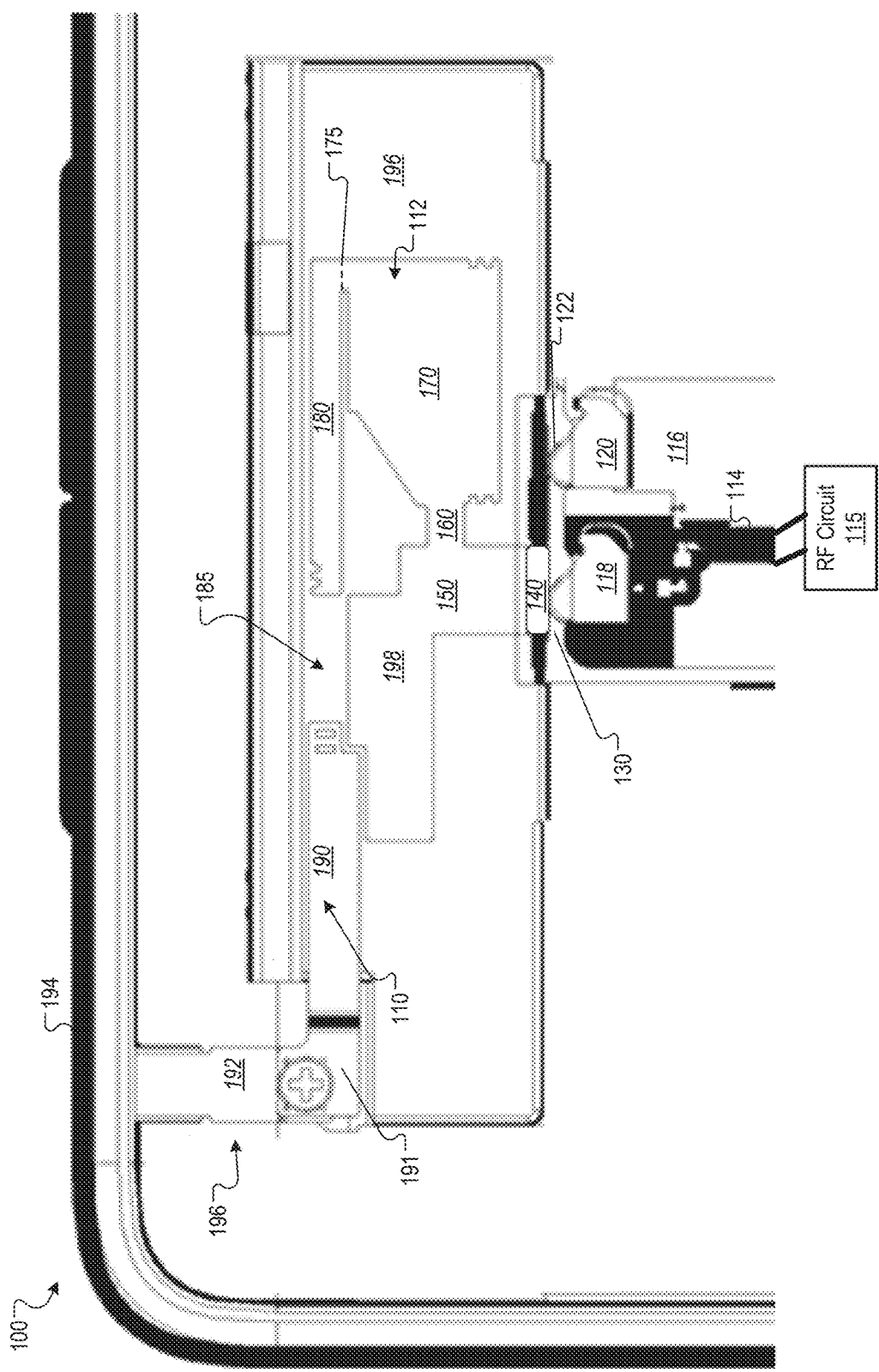
FIG. 1B is a diagram of another antenna structure of an electronic device with the low-band parasitic element and the antenna element according to one embodiment.

FIG. 1B is a diagram of an antenna structure 196 of an electronic device 100 with a parasitic element 110 and an antenna element 112 according to one embodiment. The antenna structure 196 is similar to the antenna structure 105 of FIG. 1A, as noted by similar reference numbers except as otherwise noted below. The antenna structure 196 can include: the radio frequency (RF) circuit 115, the first coupling element 118, the second coupling element 120, the ground plane 116, the antenna structure 105, and the metal cover 194. The antenna structure 196 includes the second portion 150 with an additional eighth portion 198 that is connected to the second portion 150. The eighth portion 198 extends from a second side of the second portion 150 in the fourth direction toward the sixth portion 190. The parasitic element 110 includes the sixth portion 190 that is parasitically coupled to a distal end of the eighth portion 198. The gap 185 between the fifth portion 180 and the sixth portion 190 is larger relative to the gap 185 of the antenna structure 105 in FIG. 1A.

In one embodiment, the antenna structure 196 may resonate at a fourth frequency range. In one example, the fourth frequency range may be a third high-band resonant mode. For example, the antenna structure 196 can operate in the same low band mode and two high band modes as the antenna structure 105. In this example, the antenna structure 196 can additionally operate in a fourth mode, where the antenna structure 196 has ½ wavelength mode at 4.2 GHz. In another example, the antenna element 112 of antenna structure 196 may operate as a fourth radiator. In this example, the fourth radiator may radiate at 4.2 GHz based on a signal received by the antenna structure 196 at the feed point 130. In another example, the fourth radiator, the second radiator, and the third radiator are to operate concurrently. In another example, the fourth radiator, the second radiator, and the third radiator may operate separately or independent of each other.

Figure 2A:
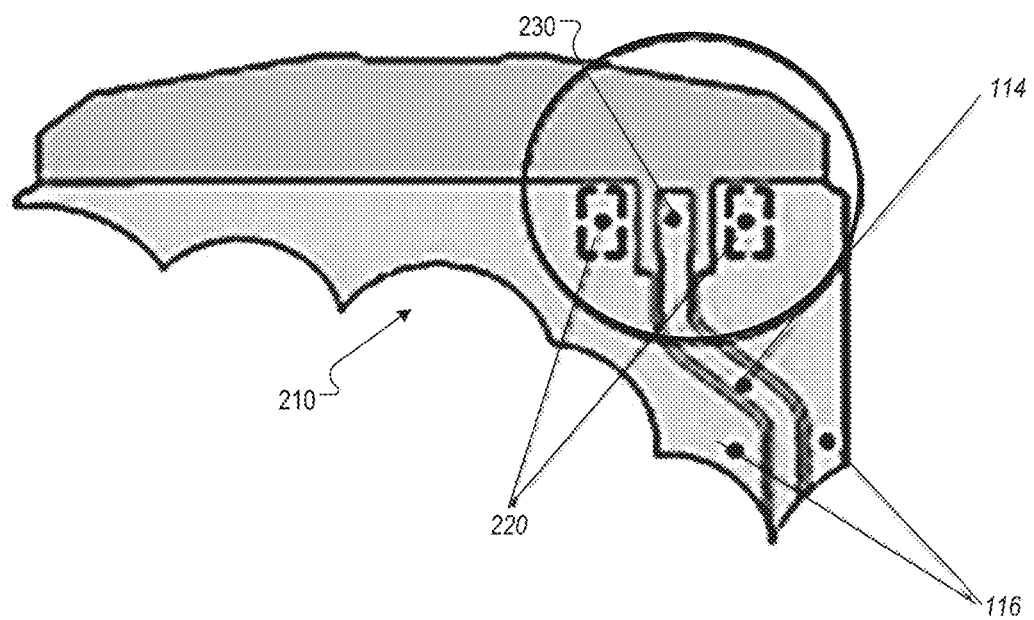
FIG. 2A shows a printed circuit board (PCB) of the electronic device according to one embodiment.

FIG. 2A shows a printed circuit board (PCB) 210 of the electronic device 100 (illustrated in FIG. 1A) according to one embodiment. The PCB 210 may include: the ground plane 116, one or more contact points 220, and a contact point 230. The contact points 220 can be part of the ground plane 116. Conductive traces 114 may connect the contact point 230 to the RF circuit 115 (illustrated in FIG. 1A). A number and location of the one or more contact points 230 and the contact point 240 may vary and the preceding embodiments and examples are exemplary and not intended to be limiting.

Figure 2B:
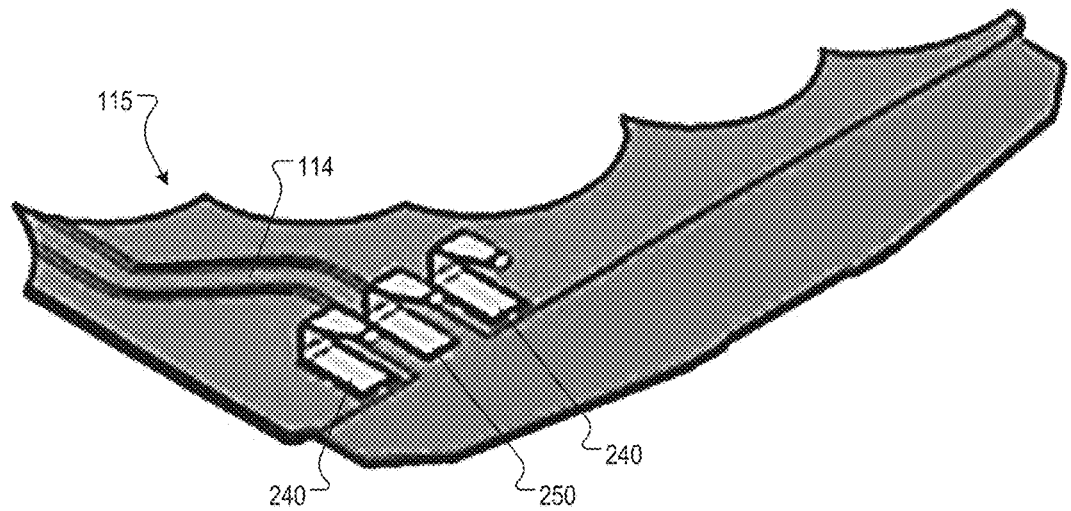
FIG. 2B shows the PCB with connectors to connect the RF circuit to the antenna structure according to one embodiment.

FIG. 2B shows the PCB 210 with connectors 240 and 250 to connect the RF circuit 115 to the antenna structure 105 (illustrated in FIG. 1A) according to one embodiment. The connectors 240 may be attached to the ground plane 116 at the contact points 220 (illustrated in FIG. 2A). The connectors 240 can couple the first portion 140 of the ground plane 116 (illustrated in FIG. 2A). The connector 250 may be attached to the conductive traces 114 at the contact points 230 (illustrated in FIG. 2A). The connector 250 can couple a feed point of the antenna structure 105 (illustrated in FIG. 1A) to the PCB 210.

The connector 250 may connect the RF circuit 115 (illustrated in FIGS. 1A and 1B) to the feed point of the antenna structure 105, where the RF circuit 115 can apply a signal to the antenna structure 105. A number, location, and/or type of the connectors 240 and 250 may vary and the preceding embodiments and examples are exemplary and not intended to be limiting. The connectors 240 and 250 can be c-clips, holders, hooks, or other types of connectors. An advantage of using the one or more connectors 240 and 250 may be to increase antenna performance. For example the antenna structure 105 may be fed at a corner of the electronic device 100. In this example, the connectors 240 and the connector 260 may be used to directly attach the antenna structure 105 to the PCB 210. In this example, the direct attachment may avoid using a dedicated feed line cable for the antenna structure 105, which may increase performance of the antenna structure and decrease a complexity and size of the electronic device 100.

Figure 3:
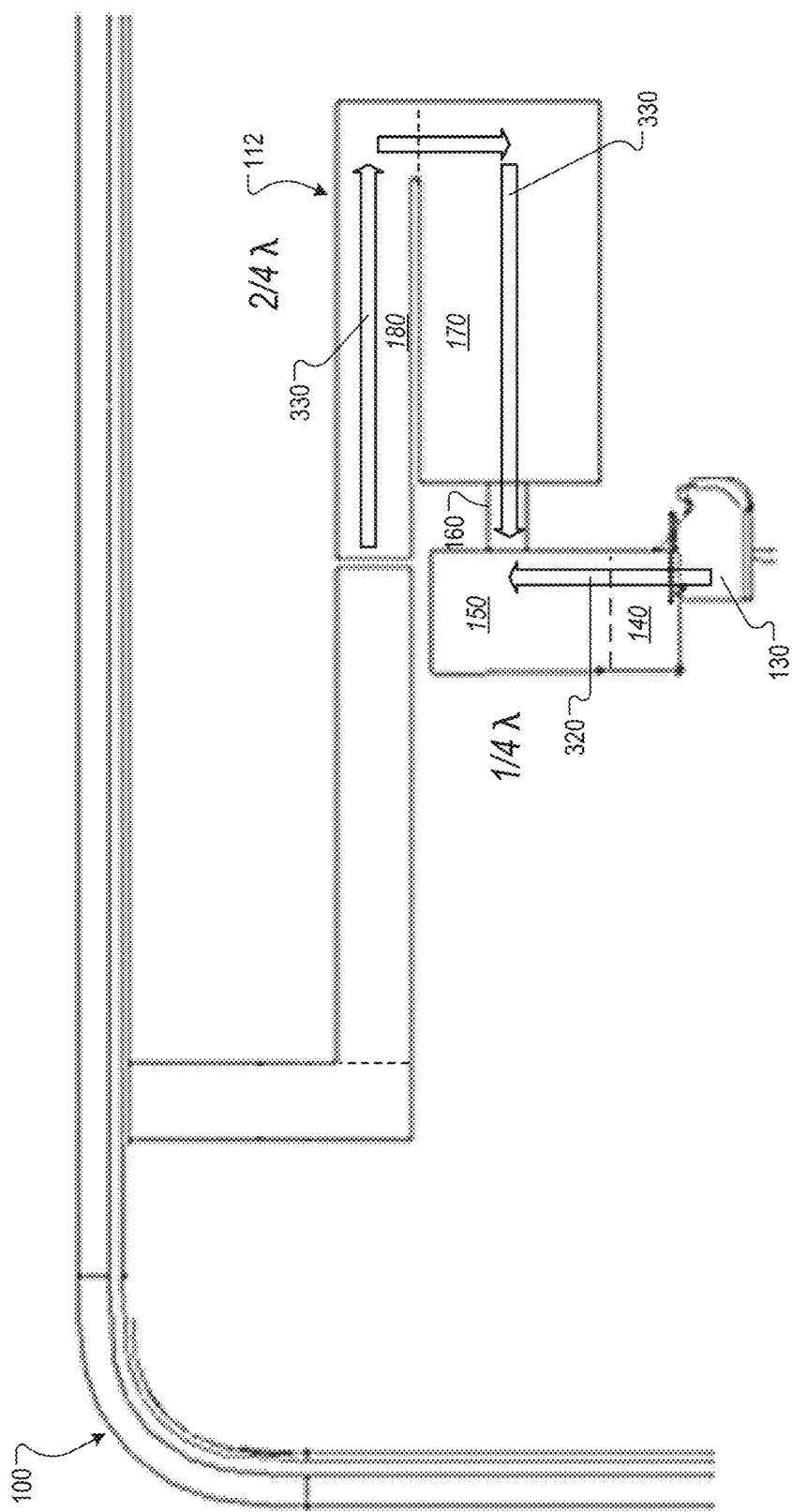
FIG. 3 illustrates current flows of the high-band structure for the electronic device according to one embodiment.

FIG. 3 illustrates current flows 320 and 330 of the antenna element 112 for the antenna structure 105 (illustrated in FIG. 1A) operating in a first high-band frequency range according to one embodiment. The current flow 320 flows in a first direction from the feed point 130 through the first portion 140 of the antenna element 112 to the second portion 150. The current flow 330 flows in a second direction from the fifth portion 180 through the fourth portion 170 to the third portion 160. The antenna element 112 may radiate at a 5 GHz frequency for the first current flow 320 and the second current flow 330.

In one example, the antenna element 112 operating in a first high-band frequency range may have an electrical length of ¾ of a wavelength (λ) corresponding to a desired frequency (e.g., a 0.75λ mode). For example, the third portion 160, fourth portion 170, and the fifth portion 180 may have an electrical length of ⅔ λ. In this example, the second portion may have an electrical length of ¼ λ. The electrical lengths of the antenna element 112 operating in a first high-band frequency range in the preceding example are not intended to be limiting. The electrical lengths of the antenna element 112 operating in the first high-band frequency range or portions of the antenna element 112 operating in the first high-band frequency range may vary in length.

FIG. 4 illustrates a current flow 440 of the parasitic element 110 for the antenna structure 105 (illustrated in FIG. 1A) operating in a low-band frequency range according to one embodiment. The current flow 440 flows from the seventh portion 192 of the parasitic element 110 to the sixth portion 190. The parasitic element 110 may radiate at a 2.4 GHz frequency for the current flow 440. In one example, the parasitic element 110 operating in a low-band frequency range may have an electrical length of ¼ λ corresponding to a desired frequency (e.g., a 0.25λ mode). For example, the sixth portion 190 and seventh portion 192 may have an electrical length of ¼ λ. The electrical lengths of the parasitic element 110 operating in the low-band frequency range in the preceding example are not intended to be limiting. The electrical lengths of the parasitic element 110 operating in the low-band frequency range or portions of the parasitic element 110 operating in the low-band frequency range may vary in length.

Figure 5A:
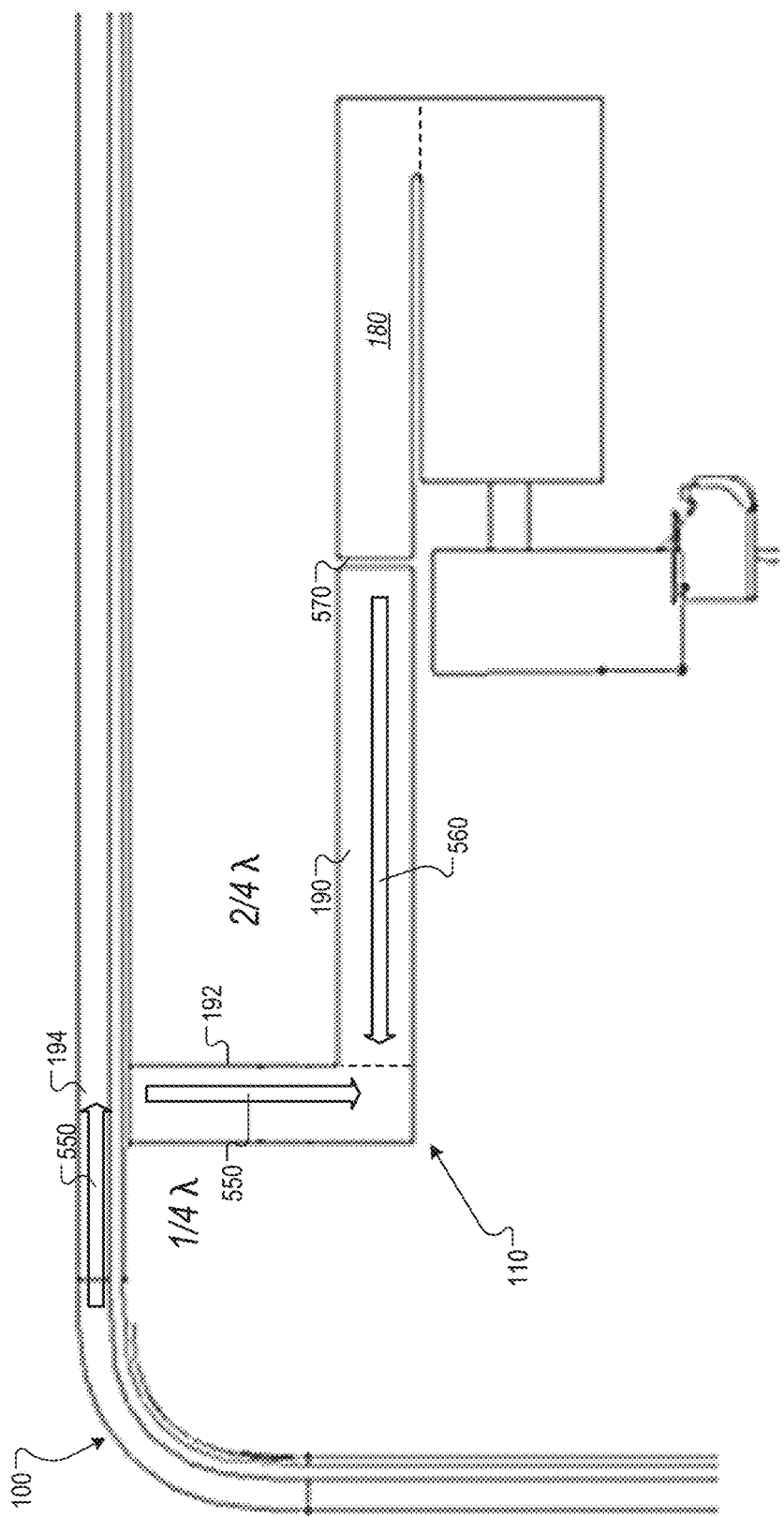
FIG. 5A illustrates a current flow of the low-band parasitic structure operating in another high frequency range according to one embodiment.

FIG. 5A illustrates current flows 550 and 560 of the parasitic element 110 for the antenna structure 105 (illustrated in FIG. 1A) operating in a second high-band frequency range according to one embodiment. The first current flow 550 flows from a location of the metal cover 194, along part of the metal cover 194, and through the seventh portion 192 of the antenna element 112 to a first part of the sixth portion 190. The second current flow 560 flows from a parasitic gap 570 (between the fifth portion 180 and the sixth portion 190) to a second part of the sixth portion 190.

The parasitic element 110 may radiate at a 6 GHz frequency for the first current flow 550 and the second current flow 560.

In one example, the parasitic element 110 operating in a second high-band frequency range may have an electrical length of ¾ λ of a wavelength λ corresponding to a desired frequency (e.g., a 0.75λ mode). For example, the portion of the metal cover 194, the seventh portion 192, and the first part of the sixth portion 190 may have an electrical length of ¼ λ. In this example, the second part of the sixth portion 190 may have an electrical length of ⅔ λ. The electrical lengths of the parasitic element 110 operating in a second high-band frequency range in the preceding example are not intended to be limiting. The electrical lengths of the parasitic element 110 operating in the second high-band frequency range or portions of the parasitic element 110 operating in the second high-band frequency range may vary in length.

Figure 5B:
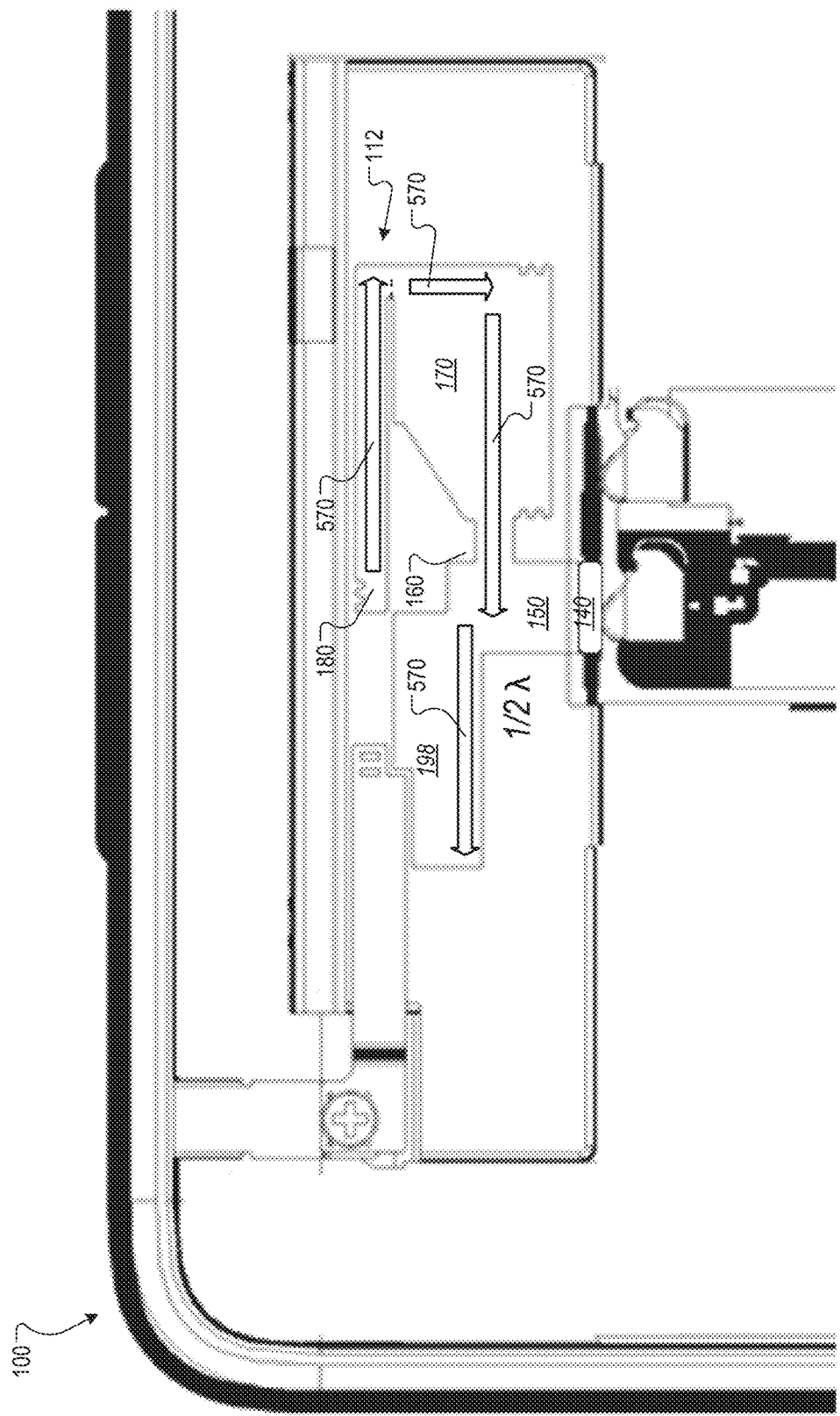
FIG. 5B illustrates a current flow of the antenna element for the antenna structure operating in a high-band frequency range according to one embodiment.

FIG. 5B illustrates a current flow 570 of the antenna element 112 for the antenna structure 196 (illustrated in FIG. 1B) operating in a third high-band frequency range according to one embodiment. The current flow 570 flows from the fifth portion 180, through the fourth portion 170, through the third portion 160, through the second portion 150, and to the eighth portion 198. The antenna element 112 may radiate at a 4.2 GHz frequency for the current flow 570.

In one example, the antenna element 112 operating in the third high-band frequency range may have an electrical length of ½ of a wavelength (λ) corresponding to a desired frequency (e.g., a 0.5λ mode). For example, the fifth portion 180, fourth portion 170, the third portion 160, the second portion 150, and the eighth portion 198 may have an electrical length of ½ λ The electrical lengths of the antenna element 112 operating in the third high-band frequency range in the preceding example are not intended to be limiting. The electrical lengths of the antenna element 112 operating in the third high-band frequency range or portions of the antenna element 112 operating in the third high-band frequency range may vary in length.

Figure 6A:
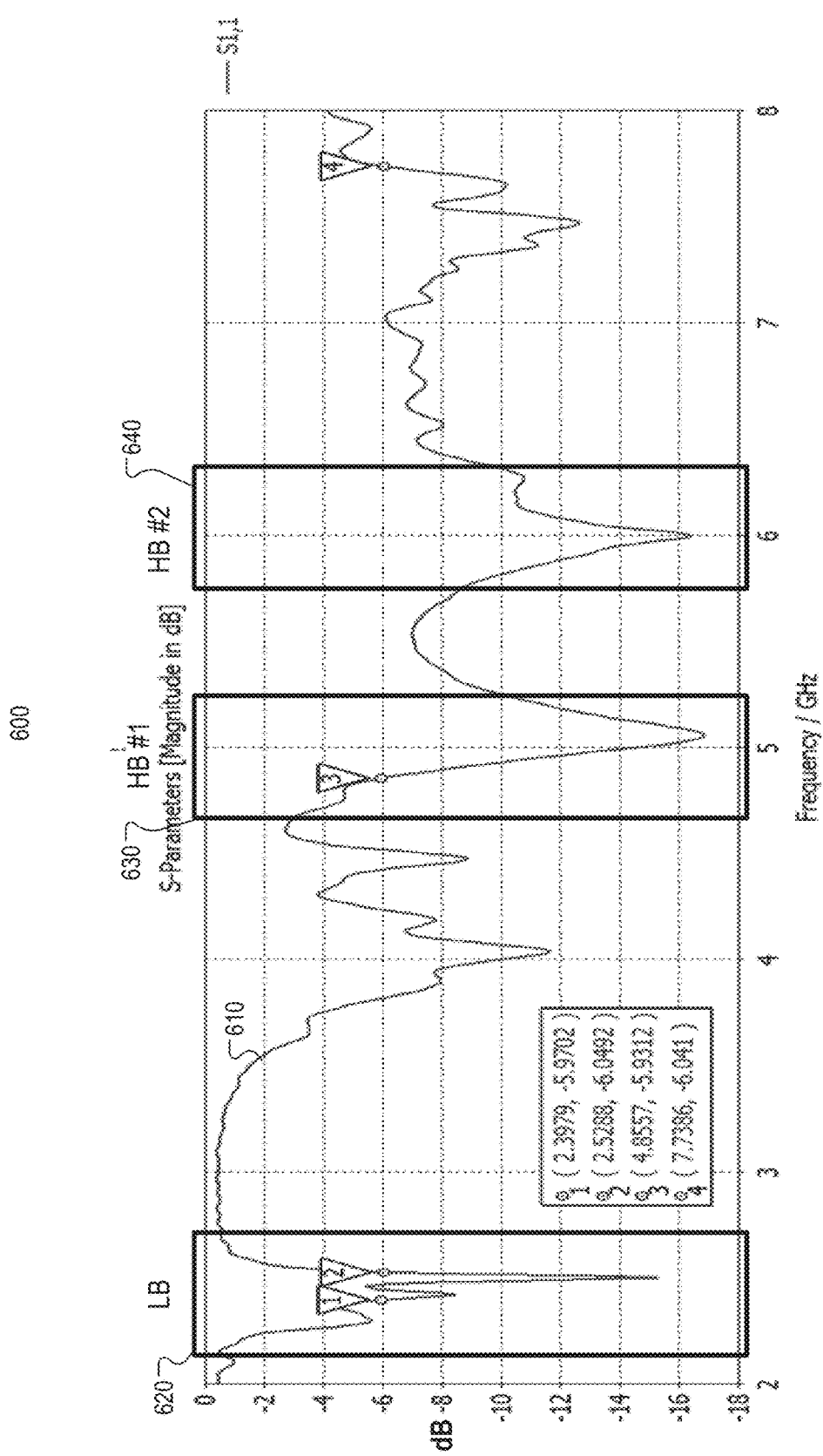
FIG. 6A is a graph of an S-parameter of the antenna structure according to one embodiment.

FIG. 6A is a graph 600 of an S-parameter 610 of the antenna structure 105 (illustrated in FIG. 1A) according to one embodiment. The S-parameter 610 is measured in decibels (dB). In one embodiment, the parasitic element 110 of the antenna structure 105 may cover a low-band frequency (LB) 620 for a frequency range of approximately 2.1 GHz to approximately 2.7 GHz. In another embodiment, the antenna element 112 may cover a first high-band frequency (HB) 630 for a frequency range of approximately 4.7 GHz to approximately 5.2 GHz. In another embodiment, the parasitic element 110 and the metal cover 194 of the antenna structure 105 may cover a second high-band frequency (UHB) 640 for a frequency range of approximately 5.7 GHz to approximately 6.4 GHz. Alternatively, other frequencies may be covered by the parasitic element 110, the antenna element 112, the metal cover 194, or a combination thereof.

Figure 6B:
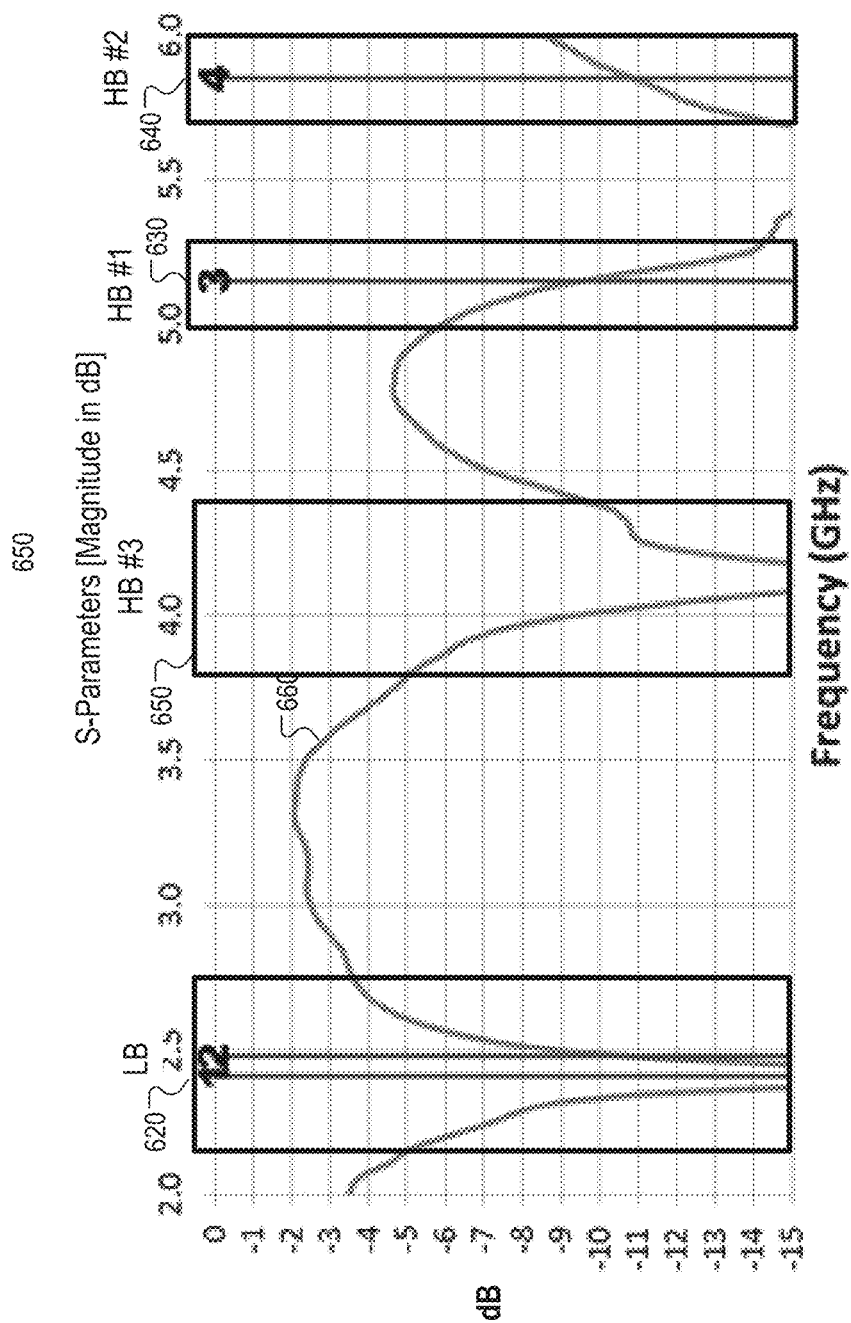
FIG. 6B is a graph of another S-parameter of the antenna structure according to one embodiment.

FIG. 6B is a graph 650 of an S-parameter 660 of the antenna structure 196 (illustrated in FIG. 1B) according to one embodiment. The S-parameter graph 650 of the antenna structure 196 is similar to S-parameter graph 600 of the antenna structure 105 of FIG. 6A, as noted by similar reference numbers except as otherwise noted below. The S-parameter 660 is measured in decibels (dB). In one embodiment, the parasitic element 110 of the antenna structure 196 may cover a low-band frequency (LB) 620 for a frequency range of approximately 2.1 GHz to approximately 2.7 GHz. In another embodiment, the antenna element 112 may cover a third high-band frequency (HB) 650 for a frequency range of approximately 3.8 GHz to approximately 4.4 GHz. In another embodiment, the parasitic element 110 of the antenna structure 196 may cover the first high-band frequency 630 for a frequency range of approximately 4.9 GHz to approximately 5.2 GHz. In another embodiment, the parasitic element 110 and the metal cover 194 of the antenna structure 196 may cover the second high-band frequency 640 for a frequency range of approximately 5.7 GHz to approximately 6.4 GHz. Alternatively, other frequencies may be covered by the parasitic element 110, the antenna element 112, the metal cover 194, or a combination thereof.

Figure 7:
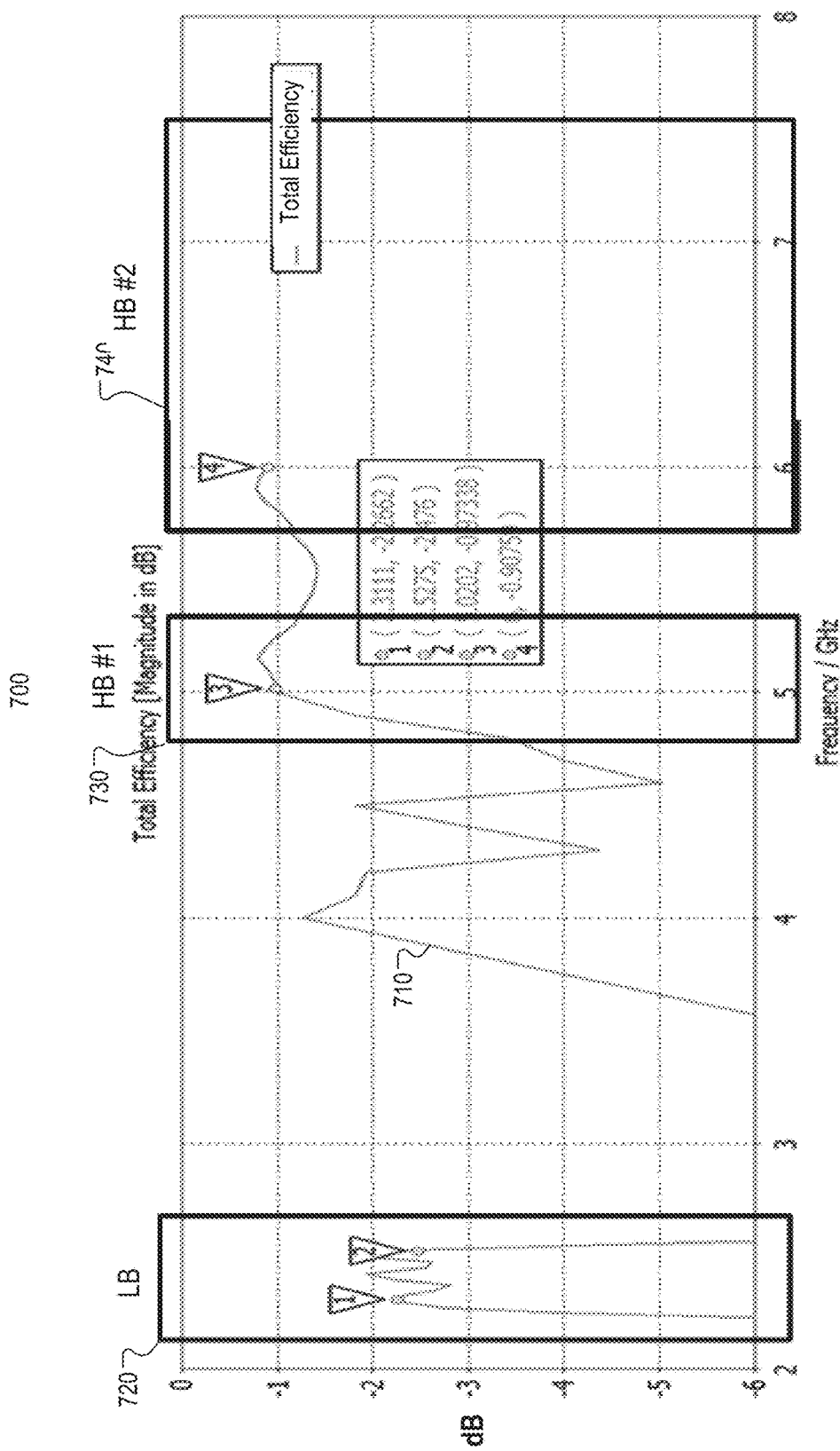
FIG. 7 is a graph of a total system efficiency for the antenna structure according to one embodiment.

FIG. 7 is a graph 700 of a total system efficiency 710 for the antenna structure 105 of FIG. 1A according to one embodiment. The graph 700 shows the total system efficiency of the antenna structure 105 in a LB 720, a HB 730, and a UHB 740. The total system efficiency 710 is measured in decibels (dB). In one embodiment, the LB 720 covers a frequency range between approximately 2.1 GHz to approximately 2.7 GHz. In one embodiment, the HB 730 covers a frequency range between approximately 4.7 GHz to approximately 5.2 GHz. In one embodiment, the UHB 740 covers a frequency range between approximately 5.7 GHz to approximately 7.7 GHz. Alternatively, other frequencies may be covered by the parasitic element 110, the antenna element 112, the metal cover 194, or a combination thereof.

Figure 8:
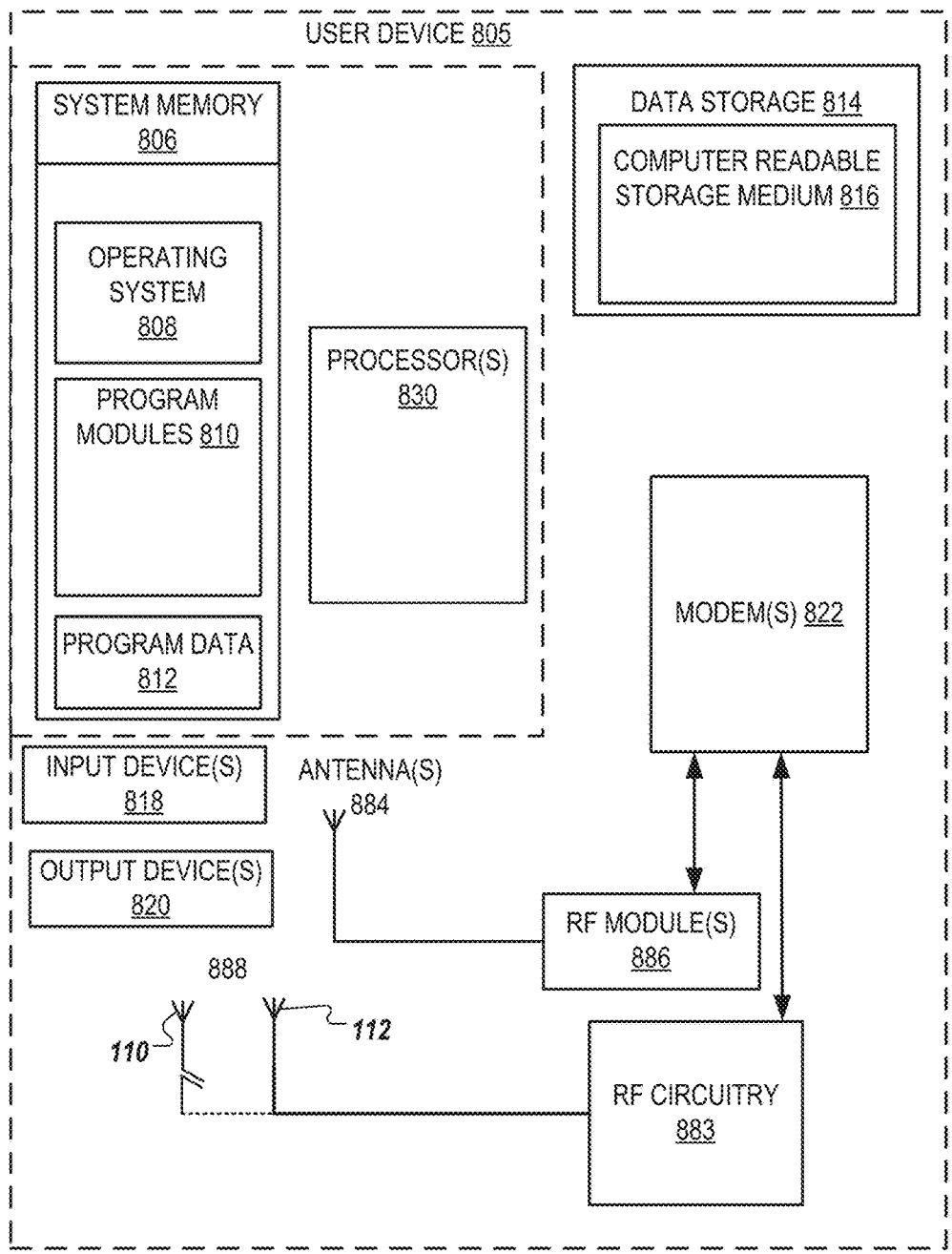
FIG. 8 is a block diagram of an electronic device in which embodiments of a radio device with an antenna structure may be implemented.

FIG. 8 is a block diagram of an electronic device or user device 805 in which embodiments of an antenna 888 with a parasitic element 110 and an antenna element 112 may be implemented. The user device 805 may correspond to the electronic device 100 of FIG. 1A. The user device 805 may be any type of computing device such as an electronic book reader, a PDA, a mobile phone, a laptop computer, a portable media player, a tablet computer, a camera, a video camera, a netbook, a desktop computer, a gaming console, a DVD player, a Blu-ray®, a computing pad, a media center, a voice-based personal data assistant, and the like. The user device 805 may be any portable or stationary electronic device. For example, the user device 805 may be an intelligent voice control and speaker system. Alternatively, the user device 805 may be any other device used in a WLAN network (e.g., Wi-Fi® network), a WAN network, or the like.

The user device 805 includes one or more processor(s) 830, such as one or more CPUs, microcontrollers, field programmable gate arrays, or other types of processors. The user device 805 also includes system memory 806, which may correspond to any combination of volatile and/or non-volatile storage mechanisms. The system memory 806 stores information that provides operating system component 808, various program modules 810, program data 812, and/or other components. In one embodiment, the system memory 806 stores instructions of the methods as described herein. The user device 805 performs functions by using the processor(s) 830 to execute instructions provided by the system memory 806.

The user device 805 also includes a data storage device 814 that may be composed of one or more types of removable storage and/or one or more types of non-removable storage. The data storage device 814 includes a computer-readable storage medium 816 on which is stored one or more sets of instructions embodying any of the methodologies or functions described herein. Instructions for the program modules 810 may reside, completely or at least partially, within the computer-readable storage medium 816, system memory 806 and/or within the processor(s) 830 during execution thereof by the user device 805, the system memory 806 and the processor(s) 830 also constituting computer-readable media. The user device 805 may also include one or more input devices 818 (keyboard, mouse device, specialized selection keys, etc.) and one or more output devices 820 (displays, printers, audio output mechanisms, etc.).

The user device 805 further includes a modem 822 to allow the user device 805 to communicate via a wireless network (e.g., such as provided by the wireless communication system) with other computing devices, such as remote computers, an item providing system, and so forth. The modem 822 may be connected to RF circuit 883 and zero or more RF modules 886. The RF circuit 883 may be a WLAN module, a WAN module, PAN module, or the like. The antenna 888 is coupled to the RF circuit 883, which is coupled to the modem 822. Zero or more antennas 884 may be coupled to one or more RF modules 886, which are also connected to the modem 822. The zero or more antennas 884 may be GPS antennas, NFC antennas, other WAN antennas, WLAN or PAN antennas, or the like. The modem 822 allows the user device 805 to handle both voice and non-voice communications (such as communications for text messages, multimedia messages, media downloads, web browsing, etc.) with a wireless communication system. The modem 822 may provide network connectivity using any type of mobile network technology including, for example, cellular digital packet data (CDPD), general packet radio service (GPRS), EDGE, universal mobile telecommunications system (UMTS), 1 times radio transmission technology (1xRTT), evaluation data optimized (EVDO), high-speed down-link packet access (HSDPA), Wi-Fi®, Long Term Evolution (LTE) and LTE Advanced (sometimes generally referred to as 4G), etc.

The modem 822 may generate signals and send these signals to antenna 888 and antenna 884 via RF circuit 883 and RF module(s) 886 as described herein. User device 805 may additionally include a WLAN module, a GPS receiver, a PAN transceiver and/or other RF modules. These RF modules may additionally or alternatively be connected to one or more of antennas 884, 888. Antennas 884, 888 may be configured to transmit in different frequency bands and/or using different wireless communication protocols. The antennas 884, 888 may be directional, omnidirectional, or non-directional antennas. In addition to sending data, antennas 884, 888 may also receive data, which is sent to appropriate RF modules connected to the antennas.

In one embodiment, the user device 805 establishes a first connection using a first wireless communication protocol, and a second connection using a different wireless communication protocol. The first wireless connection and second wireless connection may be active concurrently, for example, if an electronic device is downloading a media item from a server (e.g., via the first connection) and transferring a file to another electronic device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna element and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 822 is shown to control transmission and reception of an antenna (884, 888), the user device 805 may alternatively include multiple modems, each of which is configured to transmit/receive data via a different antenna and/or wireless transmission protocol.

The user device 805 delivers and/or receives items, upgrades, and/or other information via the network. For example, the user device 805 may download or receive items from an item providing system. The item providing system receives various requests, instructions and other data from the user device 805 via the network. The item providing system may include one or more machines (e.g., one or more server computer systems, routers, gateways, etc.) that have processing and storage capabilities to provide the above functionality. Communication between the item providing system and the user device 805 may be enabled via any communication infrastructure. One example of such an infrastructure includes a combination of a wide area network (WAN) and wireless infrastructure, which allows a user to use the user device 805 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots may be created by products using the Wi-Fi® technology based on IEEE 802.11x standards by Wi-Fi Alliance. Another of the wireless communication systems may be a wireless carrier system that may be implemented using various data processing equipment, communication towers, etc. Alternatively, or in addition, the wireless carrier system may rely on satellite technology to exchange information with the user device 805.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The electronic devices 805 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The electronic devices 805 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "ally inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed. It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An electronic device comprising:
a metal cover that is a ground plane;
a radio frequency (RF) feed;
RF circuit coupled to the RF feed;
an antenna structure coupled to the RF feed with a connector, wherein the antenna structure comprises:
an antenna element comprising:
a first portion that extends in a first direction from a feeding point at the RF feed, wherein the feed point is coupled to the RF circuit using a coupling element;
a second portion that extends from a distal end of the first portion in a second direction, the second portion being perpendicular to the first portion;
a third portion that extends from a side of the second portion in a third direction, the third portion being perpendicular to the second portion;
a fourth portion that extends from the third portion in the third direction, the fourth portion being parallel to the third portion; and
a fifth portion that extends from the fourth portion in a fourth direction, the fifth portion being parallel to the fourth portion; and
a parasitic element coupled to the metal cover, the parasitic element comprising:
a sixth portion; and
a seventh portion that is coupled to the metal cover and extends from the metal cover in a fifth direction, wherein the sixth portion extends from the seventh portion in the third direction towards the fifth portion, wherein the sixth portion is disposed to form a first gap between the sixth portion and the fifth portion and a second gap between the sixth portion and the second portion.

2. The electronic device of claim 1, wherein the RF circuit is to:
apply a first RF signal to the antenna structure to cause the antenna element to radiate electromagnetic energy in a first frequency range;
apply a second RF signal to the antenna structure to cause the parasitic element to radiate electromagnetic energy in a second frequency range; and
apply a third RF signal to the antenna structure to cause the parasitic element and the metal cover to radiate electromagnetic energy in a third frequency range.

3. The electronic device of claim 1, wherein:
the fourth portion extends along a first axis,
the fifth portion extends along a second axis,
the first axis is parallel to the second axis, and
the fourth portion is connected to the fifth portion by a connecting member.

4. The electronic device of claim 1, wherein:
the sixth portion extends along a first axis,
the seventh portion extends along a second axis,
the first axis is perpendicular to the second axis, and
the sixth portion is connected to the seventh portion by a connecting member.

5. The electronic device of claim 1, wherein:
the antenna element operates as a first radiator,
the parasitic element operates as a second radiator,
the parasitic element and the ground plane operate as a third radiator, and
the first radiator, the second radiator, and the third radiator operate concurrently.

6. An antenna structure comprising:
a ground plane;
a feed point coupled to an antenna element, wherein the feed point is to receive a signal to cause the antenna structure to radiate electromagnetic energy;
an antenna element comprising:
a first portion that extends in a first direction from the feeding point;
a second portion that extends from a distal end of the first portion in a second direction, the second portion being perpendicular to the first portion;
a third portion that extends from a side of the second portion in a third direction, the third portion being perpendicular to the second portion;
a fourth portion that extends from the third portion in the third direction; and
a fifth portion that extends from the fourth portion in a fourth direction, the fifth portion being parallel to the fourth portion; and
a parasitic element comprising:
a sixth portion; and
a seventh portion that is coupled to the ground plane and extends from the ground plane in a fifth direction, wherein the sixth portion extends from the seventh portion in the third direction towards the fifth portion.

7. The antenna structure of claim 6, wherein:
the antenna element operates in a first 0.75 wavelength ($\lambda$) resonant mode;
the parasitic element operates in a 0.25$\lambda$ resonant mode; and
the parasitic element and the ground plane operate in a second 0.75$\lambda$ resonant mode.

8. The antenna structure of claim 6, wherein:
the fourth portion extends along a first axis,
the fifth portion extends along a second axis,
the first axis is parallel to the second axis, and
the fourth portion is connected to the fifth portion by a connecting member.

9. The antenna structure of claim 6, wherein:
the sixth portion extends along a first axis,
the seventh portion extends along a second axis,
the first axis is perpendicular to the second axis, and
the sixth portion is connected to the seventh portion by a connecting member.

10. The antenna structure of claim 6, wherein:
the antenna element is configured to operate in a first 0.75 wavelength ($\lambda$) resonant mode;
the parasitic element is configured to operate in a 0.25$\lambda$ resonant mode; and
the parasitic element and the ground plane are configured to operate in a second 0.75$\lambda$ resonant mode.

11. The antenna structure of claim 6, wherein:
the antenna element operates as a first radiator,
the parasitic element operates as a second radiator,
the parasitic element and the ground plane operate as a third radiator, and
the first radiator, the second radiator, and the third radiator operate concurrently.

12. An apparatus comprising:
a printed circuit board comprising:
a processing device to generate a radio frequency (RF) signal;

a RF radio coupled to the processing device, the RF radio to send the RF signal to an antenna structure;

the antenna structure coupled to the RF radio, wherein the antenna structure comprises:

an antenna element comprising:
- a first portion that extends in a first direction from the RF radio to a second portion;
- the second portion that extends from a distal end of the first portion in a second direction, the second portion being perpendicular to the first portion;
- a third portion that extends from a side of the second portion in a third direction, the third portion being perpendicular to the second portion;
- a fourth portion that extends from the third portion in the third direction; and
- a fifth portion that extends from the fourth portion in a fourth direction, the fifth portion being parallel to the fourth portion; and a parasitic element coupled to a metal cover, the parasitic element comprising:
- a sixth portion; and
- a seventh portion that is coupled to the metal cover and extends from the metal cover in a fifth direction, wherein the sixth portion extends from the seventh portion in the third direction towards the fifth portion.

13. The apparatus of claim 12, wherein:
the antenna element operates in a first 0.75 wavelength (λ) resonant mode;
the parasitic element operates in a 0.25λ resonant mode; and
the parasitic element and the metal cover operate in a second 0.75λ resonant mode.

14. The apparatus of claim 12, wherein the RF radio is to:
apply a first RF signal to the antenna structure to cause the antenna element to radiate electromagnetic energy in a first frequency range;
apply a second RF signal to the antenna structure to cause the parasitic element to radiate electromagnetic energy in a second frequency range; and
apply a third RF signal to the antenna structure to cause the parasitic element and the metal cover to radiate electromagnetic energy in a third frequency range.

15. The apparatus of claim 14, wherein:
the first frequency range is between approximately 2.1 gigahertz (GHz) and 2.7 GHz;
the second frequency range is between approximately 4.7 gigahertz (GHz) and 5.2 GHz; and
the third frequency range is between approximately 5.7 gigahertz (GHz) and 7.7 GHz.

16. The apparatus of claim 14, wherein the first RF signal is to cause:
a first current flow from the first portion to the second portion; and
a second current flow from the fifth portion, along the fourth portion, to the third portion.

17. The apparatus of claim 14, wherein the second RF signal is to cause a third current flow from the seventh portion to the sixth portion.

18. The apparatus of claim 14, wherein the third RF signal is to cause:
a fourth current flow from the metal cover, along the seventh portion, to a first part of the sixth portion; and
a fifth current flow from a second part of the sixth portion to the first part of the sixth portion.

19. The apparatus of claim 12, wherein the antenna structure is coupled to the RF radio with a c-clip.

20. The apparatus of claim 12, wherein:
the antenna element operates as a first radiator,
the parasitic element operates as a second radiator, and
the parasitic element and the ground plane operate as a third radiator.

* * * * *